Figure 1:
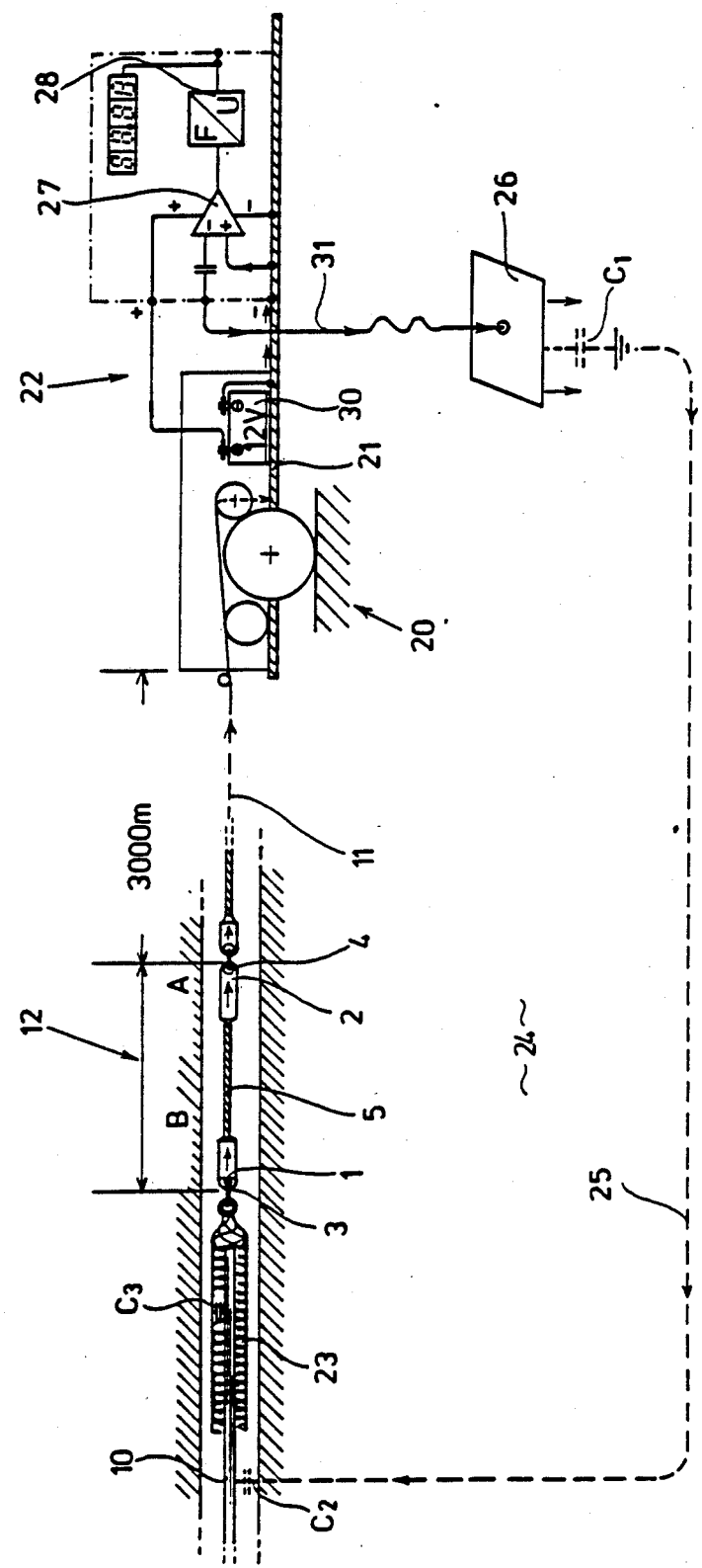

United States Patent [19]

Vemmer

[11] Patent Number: 4,939,939
[45] Date of Patent: Jul. 10, 1990

[54] APPARATUS FOR MEASURING A TRACTION FORCE BY MEANS OF A TRACTION DYNAMOMETER

[75] Inventor: Helmut Vemmer, Wuppertal, Fed. Rep. of Germany

[73] Assignee: Peter Lancier Maschinenbau-Hafenhuette GmbH & Co.,KG, Muenster-Wolbeck, Fed. Rep. of Germany

[21] Appl. No.: 283,485

[22] PCT Filed: Mar. 16, 1988

[86] PCT No.: PCT/EP88/00208
§ 371 Date: Nov. 8, 1988
§ 102(e) Date: Nov. 8, 1988

[87] PCT Pub. No.: WO88/07184
PCT Pub. Date: Sep. 22, 1988

[30] Foreign Application Priority Data
Mar. 18, 1987 [DE] Fed. Rep. of Germany ....... 3708748

[51] Int. Cl.$^5$ ............................................. G01L 5/10
[52] U.S. Cl. ................................. 73/862.44; 73/862.67
[58] Field of Search ............ 73/862.39, 862.42, 862.44, 73/862.67, 773

[56] References Cited

U.S. PATENT DOCUMENTS 3,823,395 7/1974 Rigney et al. ................ 73/862.39 X
4,458,880 7/1984 Conti ............................ 73/862.44 X

FOREIGN PATENT DOCUMENTS 2900770 7/1980 Fed. Rep. of Germany ... 73/862.39

Primary Examiner—Charles A. Ruehl
Attorney, Agent, or Firm—Felfe & Lynch

[57] ABSTRACT

Apparatus for measuring a traction force which is measured during cable laying by means of a traction dynamometer (5) disposed between the cable (10) and a wire rope (11), the dynamometer including a strain gauge and a measuring circuit which amplifies the signals received from the strain gauge and converts them into frequency-modulated signals proportional to the traction force. These signals are fed to a measurement receiver (22) set up in the area of a winch (20), the wire rope (11) incorporating a first conductor to the measurement receiver (22) and the ground (24) incorporating another conductor. The output of the measuring circuit, which is connected to the conductor carried through the ground (24) has a measurement signal carrier frequency of 3 ... 100 kHz and, with a capacitive coupling ($C_1$, $C_2$, $C_3$) galvanically separated from the ground, transfers the signals through the ground to the measurement receiver (22). The capacitive coupling includes especially the cable pull (23) and a plate electrode (26).

14 Claims, 2 Drawing Sheets

APPARATUS FOR MEASURING A TRACTION FORCE BY MEANS OF A TRACTION DYNAMOMETER

The invention relates to an apparatus for measuring a traction force during the laying of cable, using a traction dynamometer disposed between the cable and a wire rope, the dynamometer including a force measuring sensor, e.g., strain gauges, and a measuring circuit which amplifies the signals received from the force measuring sensor and converts them into frequency-modulated signals proportional to the traction force, which are conducted to a meter receiver usually set up in the area of a pulling winch, a first conductor to the meter receiver incorporating the pull rope and another conductor incorporating the ground.

Apparatus are known (the French "FERTEX" apparatus, "Capteur de Traction") for measuring a traction force by means of a traction dynamometer, in which a traction dynamometer is inserted between the cable pull rope and the actual cable. The traction dynamometer converts the measured traction forces to a frequency-modulated signal which is transferred through the metal pull rope itself. A second conductor is the earth, and so-called earthing or grounding rods are driven in the area of the winch and at the other end so-called drag conductors are galvanically connected to the measuring thimble.

The known apparatus is disadvantageous because it requires that the winch equipment be galvanically separated from the ground and that the meter station be insulated, and because it is very sensitive to short-circuits in the measuring set-up. Furthermore it is a disadvantage that grounding rods always require a freely accessible area of ground. When the earth is plastered and asphalted or otherwise covered, it can be reached only with great difficulty. Since cable laying generally involves temporary worksites, the driving of the grounding rods and the repair of the damage it causes often consumes a great amount of time. It is furthermore disadvantageous that the attached drag conductor is easily pinched off by the pulling, parallel cable, especially in curves.

The problem accordingly arises of improving an apparatus of the kind described above so as to reduce the time needed for the construction and removal of the measuring and pulling stations on the one hand and on the other hand to make them less liable to trouble during pulling and measuring.

This problem is solved in an apparatus for measuring traction force by the fact that the output of the measuring circuit, which is connected to the conductor carried over the ground, has an appropriate measurement signal carrier frequency that is preferably between 3 and 100 kHz, and transmits the signals through the ground to the measurement receiver with a capacitive coupling separated galvanically from the ground.

In the apparatus described above, the dynamometer, the transmission lines and the measurement receiver are coordinated with one another such that a distance of 3000 meters can be covered. At the same time the traction dynamometer and the measurement receiver can be associated basically with any desired pulling winch. The advantage of the above-named capacitive coupling and uncoupling of the measurement signal through an earth connection is that no galvanic grounding rods and drag conductors are necessary.

A further advantage of the apparatus is that use can be made advantageously of the circumstances involved in the cable laying.

If the laying operation involves, as it commonly does, cables which contain at least one insulated metallic conductor or shielding, the cable end can be surrounded on part of its length by an electrically conductive sleeve or mesh-like device, which is connected electrically to the measuring circuit and forms a first condenser. The metal conductor of the cable forms on the rest of the length of the cable a condenser electrode with respect to the ground. A conventional metal cable grip can be used as the sleeve-like or mesh-like device.

At the measurement receiver end, an insulated plate electrode which can be laid on the ground is preferably connected to the input of the receiver. This is preferably a kind of rubber mat, i.e., a mat in which one or more plate electrodes are embedded in a nonconductive elastomer. The plate electrodes are flexible metal pieces.

It is also possible, however, to make the plate electrode from conductive rubber which, if desired, is insulated externally.

It has been found that the capacitively coupling metal areas of the plate electrode should be between 2000 and 20,000 cm$^2$, in order to assure a sufficient transfer with the lengths mentioned above. Departures from these values are acceptable according to need and the nature of the soil.

In the apparatus in accordance with the invention, the capacitive ground connection on the one hand is thus produced via a capacitive connecting of the cable pull to the telephone cable, which in turn again produces a capacitive connection to the ground, and on the other hand it is made through a conductive rubber mat which lies on the ground in the area of the measurement receiver and is connected by a wire to the measurement receiver.

Additional advantages of the apparatus described above also result from the fact that the measurement receiver need have only one electrically insulated input, and that this input is connected to the plate electrode. A galvanic separation of the instrument housing from the pulling winch is thus no longer necessary. It follows that the signal potential transmitted through the pull rope lies preferably at the ground potential of the measurement receiver.

In an unpublished German patent application of the present applicant (P 37 08 749.5) there is described a traction dynamometer which consists of two metal housings connected by a conductive wire rope, a storage battery being built into the second housing and the rest of the parts of the measuring circuit into the first housing. When a traction dynamometer of this kind is used, the two metal housings constitute two poles A and B insulated from one another, between which the alternating voltage of the measurement signal is present. Furthermore, the two housings can be provided at their outer ends with mechanical coupling means such as traction eyes, for example.

Lastly, it is another advantage that the ground potential of the measurement receiver is connected to the chassis of the pulling winch and that the power supply of the measurement receiver can be delivered directly from a starter storage battery of the pulling winch, i.e., without a separate DC source.

Figure 2:
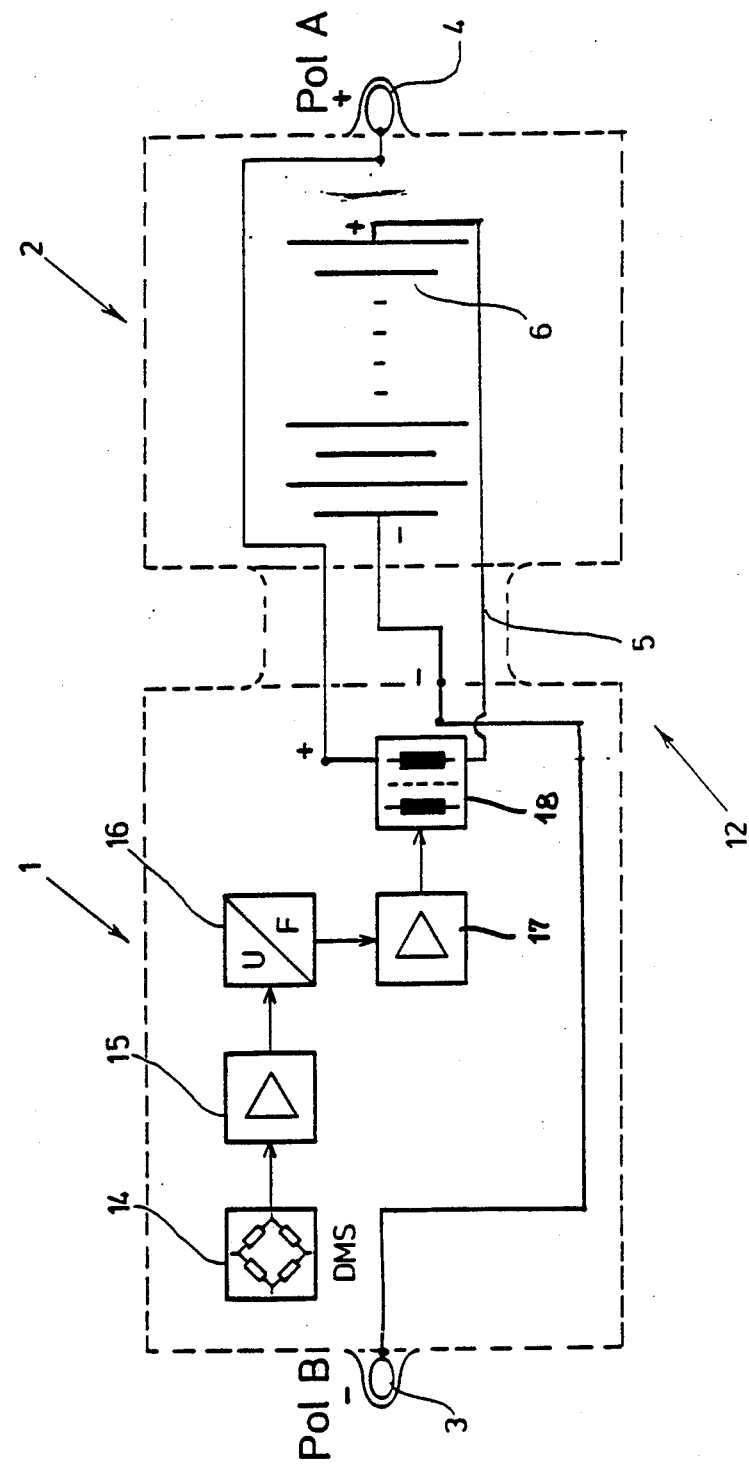

An embodiment of the apparatus and details thereof are represented in the drawing. The figures of the drawing show specifically:

FIG. 1 a diagrammatic representation of the parts of the apparatus in one embodiment;

FIG. 2 a diagrammatic representation of the traction dynamometer.

FIG. 1 represents an apparatus for measuring a traction force which is measured during the cable laying by means of a traction dynamometer 12 disposed between a telephone cable 10 and a steel wire rope. The telephone cables are tension-sensitive cables which are pulled into cable ditches, tubes and the like. It is to be noted, however, that steel wire ropes, flexible tubes, high-voltage cables and the like can also be laid instead of the telephone cable.

The actual traction dynamometer 12 consists of two housings 1 and 2 which are provided at their outer ends with traction eyes 3 and 4. The inner ends of the two housings 1 and 2 are connected together by a wire rope 5 containing at least two conductors. Housing 1 contains the essential parts of a measuring circuit, while housing 2 contains only the storage battery 6 serving to supply power to the measuring circuit.

FIG. 2 is a highly schematic representation of the traction dynamometer, which consists of the above-mentioned three parts:

case 1 with the measuring circuit, case 2 with the storage battery 6, and the steel rope 5.

The measuring and transmitting process is based on measuring the tension prevailing between the two eyes 3 and 4 by means of a strain gauge 14 in the traction force transmitter. This traction force is sensed by the strain gauge 14 and transmitted as an electrical voltage signal to a preamplifier 15. Any change caused by traction force in this strain gauge produces a voltage change in the bridge circuit.

After this signal is amplified in the preamplifier 10 it is delivered to a voltage-to-frequency converter 16. This voltage-to-frequency converter usually operates with a low-frequency alternating voltage of about 10 kHz. It has been found, however, that, even in the event of departures from these values, by working with measurement signal carrier frequencies between 3 and 100 kHz reliable measurements are obtained.

The signals received from the strain gauge 14 serve accordingly for proportional frequency modulation according to the traction force. The frequency-modulated output signal of the voltage-to-frequency converter 16 is fed to a transfer circuit, which in the present case includes a final amplifier 17 and a transformer 18. The transformer 18 serves for potential isolation, as well as for the matching and control of the final amplifier 17. Accordingly, a signal S is available at the output of the transformer, and is the signal to be transmitted.

The low-frequency alternating current signal S reaches the traction eye 4 and thus the pole A. The steel wire pull rope 11 is attached to this pole A. This wire traction rope 11 is carried over a winch 20 which is constructed in a known manner and has a separate motor drive. The winch 20 is equipped with a conductive chassis 21. It is, as a rule, insulated from the ground. Accordingly, the signal potential transmitted through the wire rope 11 is at the ground potential of a measurement receiver 22. The additional signal potential of the traction dynamometer 12 is transferred through the pole B. Pole B is galvanically connected to a metal cable pull 23 which can be drawn in the expanded state over the end of the telephone cable 10 and after constriction holds fast thereto in a friction grip. The metal cable pull and the conductor 10 containing at least one insulated metal conductor core or shielding accordingly form a first condenser and permit a capacitive connection to the cable. This capacitive connection is identified as $C_3$ and by a capacitor symbol.

Another part of the transmission circuit is formed by a capacitor $C_2$ to ground. The core of the cable 10 and the insulation in which it is embedded form a capacitance with the ground 24. This capacitive connection is also identified by a capacitor symbol. The ground return line 25 is represented in broken lines.

The capacitive terminal in the area of the measurement receiver 22 is formed by a plate electrode 26 laid on the soil and galvanically insulated therefrom. The plate electrode consists in the present case of conductive rubber, as known in itself, which is embedded in a nonconductive plastic composition.

The result is another capacitance $C_1$, namely, the capacitive connection to the ground in the area of the measurement receiver 22.

In the measurement receiver 22 there is contained a selective amplifier 27 which boosts the measurement signal that is greatly attenuated by the transmission line and supplies a "clean" measurement signal of constant amplitude. Such circuits can be made in various ways and are familiar to the person skilled in the art. The processed signal is fed to a frequency-to-voltage converter 28 which in turn makes the signal available to an additional measurement circuit as a proportional voltage change.

In the further circuit, an additional digital processing is performed on the measurement voltage obtained, for the recording of the measurement signal and for the control of the cable winch.

The inputs of the amplifier 27 are connected such that the positive input of the difference amplifier is at the ground potential. The ground potential of the difference amplifier is simultaneously the minus potential of the power supply of the receiver, since the latter operates with an asymmetrical single working voltage. Accordingly, the housing 29 of the measurement receiver 22 is at the ground potential. At the same time it is connected to the chassis 21 of the cable winch 20 so that the power supply of the measurement receiver 22 can come directly from the storage battery 30 present in the cable winch. Difficulties with different potentials are thus avoided. The ground potential of the measurement receiver 22 is conductively connected by the chassis 21 to the wire rope 11, so that the measurement receiver 22 is galvanically connected at one pole to pole A of the traction dynamometer.

The inverting pole of the amplifier 27, marked "—", is brought out by a plug connector through insulation and is connected to the plate electrode 26 by a conductor 31. This connection accordingly represents the actual measurement receiver input. The plate electrode 26 is accordingly a kind of antenna of the measurement receiver; it is not, however, used as an electromagnetic antenna, but constitutes only one member of the capacitive coupling of the amplifier 27 to the traction dynamometer 12.

Since an alternating current is present at the input of the measurement receiver 22, the polarity of the two lines alternates and cannot be defined simply as "+" or "—". Accordingly it matters not whether the potential of the wire rope, which is simultaneously at the potential of the chassis 21, is considered as a "hot" connection which is to be applied to the insulated measurement receiver input, while the potential of the plate electrode 26 is to be wired at the ground potential of the receiver, or whether the connection is to be inverted. In any case the potential difference between the wire rope 11 and the plate electrode 26 runs as the controlling alternating current to the input of the measurement receiver 22, if the corresponding input of the measurement receiver is insulated from the cable winch 20 and also has a galvanically separate power supply.

In practical operation, however, the need for a galvanic separation of the power supply is very disadvantageous. Furthermore it has been found that reception losses are to be feared if the housing of the measurement receiver 22 has to be insulated from the chassis 21 of the cable winch. The transmission method in accordance with the invention therefore operates such that the plate electrode 26 is wired to the insulated, inverting receiver input. In this configuration no separation of potentials is needed. The measurement receiver 22 can be connected directly to the storage battery 30 of the cable winch. Of course, the housing of the measurement receiver 22 can be let come in contact with the chassis 21, since both potentials are already connected through the minus pole of the storage battery 30.

An additional advantage is obtained by the fact that the connection to the wire rope 11 is also made automatically through the minus pole of the storage battery 30. In this arrangement of the system, therefore, all that is needed is to provide the flexible, insulated plate electrode with an insulated flexible feeder 31 and to plug it as a "hot connection" into the insulated input of the measurement receiver 22.

On the course of the ground line, three capacitances $C_1$, $C_2$ and $C_3$ are connected in series. Accordingly, the capacitance of the cable pull-to-cable connection $C_3$ and the capacitance of the plate electrode 26 are responsible for the damping or attenuation of the desired signal. It has been found that, assuming a minimum signal amplitude at the input of the measurement receiver 22 of no less than 70 volts, a cable pull 23 approximately 100 cm long (usually 75 to 120 cm) and a plate electrode with about $0.5 \text{ m}^2 = 5000 \text{ cm}^2$ of coupling metal surface area are necessary for the described apparatus. The losses of the system can be compensated by suitable electronic elements, so that a processable signal with a usable signal-to-noise ratio can be recovered.

As it can be seen in FIG. 2, the traction dynamometer 12 consists of the two housings 1 and 2 already described, which are connected together by a wire rope 5. The wire rope with its two insulated conductors is joined to the housings 1 and 2 such that they constitute two poles A and B insulated from one another. These two poles A and B simultaneously constitute the charging terminals for the built-in storage battery 6, so that between work cycles contact electrodes of a battery charger can be connected galvanically to poles A and B and the storage battery 6 can be charged.

I claim:

1. Apparatus for measuring a traction force which is measured during a cable-laying comprising: a traction dynamometer disposed between a cable and a conductive traction rope, the dynamometer including a force measuring sensor and a measuring circuit which amplifies the signals received from the force measuring sensor and converts them to frequency-modulated, traction-force-proportional measurement signals, a measurement receiver, the measurement signals being fed to the measurement receiver, the traction rope incorporating a first conductor to the measurement receiver and the ground incorporating a second conductor, the output of the measurement circuit, which is connected to the conductor carried through the ground, transferring the measurement signals through the ground to the measurement receiver with a capacitive coupling galvanically separated from the ground.

2. Apparatus in accordance with claim 1, in which the measurement signals have a carrier frequency which is between 3 and 100 kHz.

3. Apparatus in accordance with claim 1, which includes an electrically conductive sleeve-like device and in which, in laying of a cable containing at least one insulated metal core, the electrically conductive sleeve-like device seizes the cable on a portion of its length, which device is conductively connected to the measurement circuit and forms a first condenser, the core of the cable acting on the rest of its length as a condenser electrode with respect to the ground.

4. Apparatus in accordance with claim 3, in which the sleeve-like device comprises a metal cable pull.

5. Apparatus in accordance with claim 1, which includes an insulated plate electrode which can be laid on the ground and is connected to an input of the measurement receiver.

6. Apparatus in accordance with claim 5, in which the plate electrode comprises conductive rubber.

7. Apparatus in accordance with claim 5, in which the plate electrode comprises flexible metal parts embedded in an elastomer.

8. Apparatus in accordance with claim 5, in which the plate electrode has a capacitively coupling area between 2000 and 20000 $\text{cm}^2$.

9. Apparatus in accordance with claim 5, in which the measurement receiver has only one electrically insulated input and that this input is connected to the plate electrode.

10. Apparatus in accordance with claim 1, in which the signal potential transmitted through the conductive rope is at a ground potential of the measurement receiver.

11. Apparatus in accordance with claim 1, in which the traction dynamometer comprises two metal housings connected through a conductive rope and in which a storage battery is built into a second housing and the rest of the parts of the measurement circuit are built into a first housing, the two metal housings constituting two poles A and B insulated from one another, between which an alternating voltage of a measurement signal is present.

12. Apparatus in accordance with claim 11, in which the housings are galvanically connectable as insulated poles (A, B) to contact electrodes of a charging generator.

13. Apparatus in accordance with claim 1, in which the two housings have at their outer end mechanical coupling devices.

14. Apparatus in accordance with claim 1, in which the ground potential of the measurement receiver is connected to an available chassis of a winch, and in which the measurement receiver has a power obtained directly from a starter storage battery of the winch.

* * * * *